United States Patent [19]

Bailey et al.

[11] 4,269,807

[45] May 26, 1981

[54] CATALYTIC CONVERTER MOUNTING ARRANGEMENT FOR REDUCING BYPASS LEAKAGE

[75] Inventors: Charles H. Bailey, Mt. Prospect; Ted V. DePalma, Schaumburg; James E. Dillon, Elgin, all of Ill.

[73] Assignee: UOP Inc., Des Plaines, Ill.

[21] Appl. No.: 86,990

[22] Filed: Oct. 22, 1979

[51] Int. Cl.³ .......................... F01N 3/28; B23P 19/04; B32B 31/06
[52] U.S. Cl. .................................. 422/179; 29/157 R; 29/455 R; 29/458; 264/262; 422/180
[58] Field of Search ............... 422/177, 179, 180, 171; 29/157 R, 455 R, 458; 264/262, 257 US

[56] References Cited

U.S. PATENT DOCUMENTS

| | | | |
|---|---|---|---|
| 3,511,906 | 5/1970 | Bergemann et al. | 264/262 |
| 3,876,384 | 4/1975 | Santiago et al. | 422/179 |
| 3,966,419 | 6/1976 | Bloomfield | 422/179 |
| 3,975,826 | 8/1976 | Balluff | 422/179 X |
| 3,990,859 | 11/1976 | Waite | 422/179 |
| 4,004,887 | 1/1977 | Stormont | 422/179 |
| 4,101,280 | 7/1978 | Frietzsche et al. | 422/180 |
| 4,142,864 | 3/1979 | Rosynsky et al. | 422/179 |
| 4,143,117 | 3/1979 | Gaysert | 422/179 |
| 4,163,042 | 7/1979 | Lynch | 422/179 |

FOREIGN PATENT DOCUMENTS 2515732  11/1976  Fed. Rep. of Germany .......... 422/179

OTHER PUBLICATIONS

Interam, Inorganic Intumescent Materials, Mounting Applications, 3M Publication, 16 pp., Aug., 2, 1976.
B. J. Hogan, "Expandable Inorganics Mount/Protect Catalytic Converter Element, Design News," pp. 64–65, Oct. 20, 1975.
J. Abthoff et al., Development of Canistering Systems for Monolithic Catalysts, SAE paper given at Automobile Engineers Meeting, Deerborn, Michigan, Oct. 18–22, 1976.

Primary Examiner—Joseph Scovronek
Attorney, Agent, or Firm—James R. Hoatson, Jr.; Barry L. Clark; William H. Page, II

[57] ABSTRACT

Arrangement for resiliently mounting a ceramic monolithic type catalytic converter element in a metal housing with a blanket of knit wire mesh material includes at least one circumferential band of high temperature intumescent material containing ceramic fibers positioned within the wire mesh blanket which prevents virtually all bypass leakage around the element and substantially reduces the temperature of the wire mesh.

4 Claims, 4 Drawing Figures

CATALYTIC CONVERTER MOUNTING ARRANGEMENT FOR REDUCING BYPASS LEAKAGE

BACKGROUND OF THE INVENTION

Monolithic type catalytic converters are in widespread use and typically have their ceramic element mounted in a resilient knitted wire mesh which cushions the ceramic and permits expansion and contraction of the metal housing relative thereto. Under certain operating conditions, especially where the engine adjustments have deteriorated, excessive temperatures can be produced in the catalytic converter. Such high temperatures can promote oxidation or even melting of the wire mesh and a consequent loss of strength and resiliency which reduces the grip of the mesh on the ceramic element. The ceramic then becomes loose and destroys itself. The wire mesh also permits a degree of bypass leakage of the exhaust gases. The leakage not only defeats the purpose of the converter for controlling pollution but accelerates the oxidation of the metal mesh.

SUMMARY OF THE INVENTION

It is among the objects of the present invention to provide a way to virtually prevent all bypass leakage in a catalytic converter and to reduce the temperature to which the wire mesh material surrounding the ceramic monolith is exposed. These and other objects are achieved by applying a circumferential band of high temperature, intumescent caulking material directly into the wire mesh and substantially through its thickness before the ceramic element and wire mesh are assembled to the converter housing. The caulking material preferably comprises ceramic fibers such as aluminum oxide into which vermiculite particles are mixed. The vermiculite particles expand to many times their original volume when the assembled unit is first heated to about 1000° F. and remain in their expanded condition. When expanded, the caulking retains sufficient resiliency to maintain a seal against bypass gases despite the repeated heating and cooling cycles of the converter assembly. When the intumescent material is used alone it tends to lose some of its resiliency after many heating and cooling cycles. However, when it is injected into the matrix of the wire mesh, it is reinforced by the mesh and remains able to expand and contract with cycling of the temperature. Tests of a converter modified in accordance with the invention showed that not only was bypass leakage prevented but the temperature of the metal wire mesh was reduced substantially. Quite unexpectedly, the temperature of the outer surface of the monolith as well as the temperature of the inner wall of the housing or shell were much lower than with four other converters tested at the same time which were identical except for mounting and sealing modifications. For example, at an inlet gas temperature of 1514° F., which would correspond to an operating condition of a nearly wide-open-throttle high speed pull under high load conditions, the inside surface of the housing had upstream, center and downstream temperatures of 1264° F., 1042° and 982°, respectively. The closest other converter (coated with Fiberfrax and mounted in metal mesh with end ropes) had temperatures of 1319° F., 1225° and 1136° under similar operating conditions. Comparing the improved converter to the average of the other four converters at an inlet temperature of 751° F. showed the inner wall of the housing or shell ran 29° F., 64° and 34° cooler at its upstream, center and downstream portions, respectively. Similar figures for a 1350° F. inlet temperature were 47° F., 198° and 168°. Finally, for a 1514° F. inlet temperature, the figures were 49° F., 205° and 178°.

Although only one embodiment, having a narrow band of intumescent caulking material near its center, was tested, it is presumed that satisfactory results would also be achieved if the band of caulking was much wider or if it was placed near one end, or if multiple bands were used. Since the downstream end of the test converter housing seemed to remain cooler than the upstream end, it would seem preferable to place a single caulking band more toward the converter inlet end. However, the mesh and monolith element will be protected as long as mesh resiliency and firm contact with the monolith is maintained at at least one location along the length of the monolith.

DESCRIPTION OF THE PREFERRED EMBODIMENT

Figure 1:
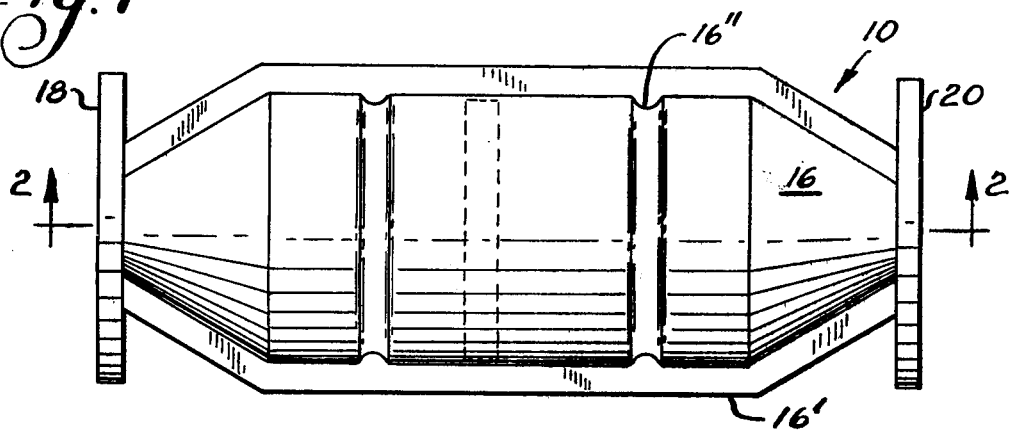
FIG. 1 is a top view of a catalytic converter incorporating the invention.
Figure 2:
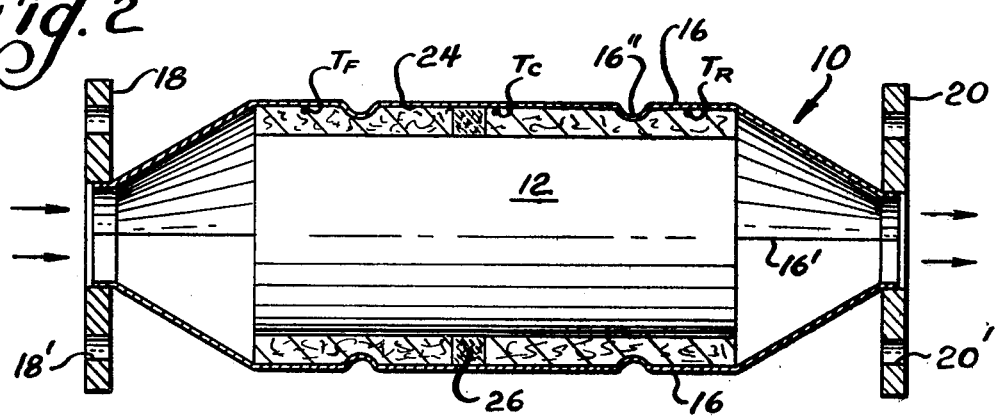
FIG. 2 is a front sectional view taken on line 2—2 of FIG. 1.
Figure 3:
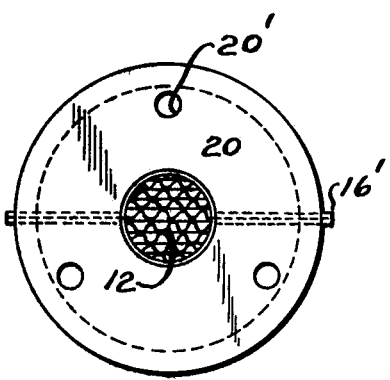
FIG. 3 is an end view of the converter of FIG. 1.

FIGS. 1–3 illustrate one type of outer housing 10 used to house and support a monolithic ceramic catalyst element 12. The housing is shown as comprising identical upper and lower halves 16 having welded edge flanges 16' and inlet and outlet support flanges 18, 20 containing apertures 18', 20' for connecting the unit into an exhaust system. Surrounding the ceramic element 12, and cushioning it, is a blanket of knitted wire mesh material 24 which is partially compressed throughout its length. The element is shown as being round but could be oval or other shape if desired. In addition, rib portions 16" are provided to further compress the mesh 24 to insure that the element 12 will be tightly enough grabbed that it will not be able to rotate or move longitudinally. The preceding description describes a structure which is known. Our invention is to add a band 26 of high temperature, intumescent material containing ceramic fibers as a viscous caulking or paste within the matrix of metal mesh 24. The caulking used was a ⅜ inch wide band of a water base paste made of aluminum oxide fibers and grains of vermiculite sold by 3M Company under the tradename, Interam. The band was less than 10 percent of the 5.5 inch length of the element 12. Although in a test, a relatively narrow band of caulking was applied just upstream of the center of the housing 16, one would expect that a wider band would also work well. One might also expect, based on the fact that the inner shell wall was much cooler than the other constructions tested on the downstream rather than upstream side of the caulking band, that placement of the band near the upstream end might be preferred.

Figure 4:
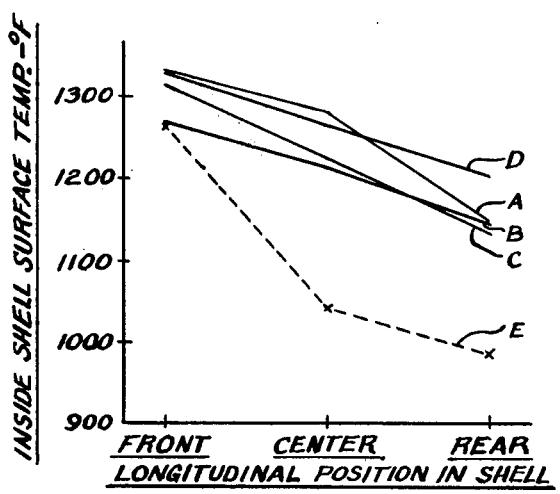
FIG. 4 is a graph of temperature versus thermocouple position for the converters receiving exhaust gas at their inlets at a temperature of 1514° F.

The designs to which the improved design were compared were constructed as follows: Sample "A" had a metal mesh blanket without end rope portions; Sample "B" was the same as "A" except with end rope portions;

Sample "C" was the same as "B" except the ceramic element was machined to remove ⅛" from its diameter and a Fiberfrax coating of corresponding thickness was added; Sample "D" was the same as "B" except 7½% of the cells (the peripheral two rows) were plugged with a cement. FIG. 4 is a graph illustrating the temperature of the inside of the shell or housing at its front, center and rear as measured by the thermocouples $T_F$, $T_C$, and $T_R$, respectively, when the exhaust gas entering the inlet end of the converters was at 1514° F. The thermocouples were placed longitudinally of the inside surface of the shell 24 as indicated in FIG. 2. The dramatic lowering of the inside shell temperature by the construction of the invention is quite evident in FIG. 4 where the improved design is denoted as Sample "E".

We claim as our invention:

1. In a catalytic converter of the type having a ceramic monolithic catalyst element held within a metal housing by a blanket of resiliently compressed metal wire mesh, the improvement wherein a continuous circumferential band of intumescent material containing ceramic fibers is positioned within said mesh blanket and throughout the thickness thereof at at least one position along the axial length of said catalyst element, said band of intumescent material being of substantially less axial length than said catalyst element and expandable when heated so as to block any longitudinal bypass leakage through said wire mesh.

2. The catalytic converter of claim 1 wherein said band of intumescent material, when applied, contains particles of vermiculite and ceramic fibers in a water based paste.

3. The catalytic converter of claim 2 wherein said band has an axial extent which is less than 10 percent of the length of the catalyst element.

4. The catalytic converter of claim 1 wherein said band of intumescent material is positioned closer to the inlet end of said converter than to the outlet end.

* * * * *